(12) United States Patent
Ryu (10) Patent No.: US 7,688,879 B2
(45) Date of Patent: Mar. 30, 2010

(54) METHOD AND APPARATUS FOR FORMING A BEAM

(75) Inventor: Kil-Hyen Ryu, Suwon-si (KR)

(73) Assignee: Samsung Electronics Co., Ltd., Suwon-si Gyeonggi-do (KR)

( * ) Notice: Subject to any disclaimer, the term of this patent is extended or adjusted under 35 U.S.C. 154(b) by 1317 days.

(21) Appl. No.: 11/034,960

(22) Filed: Jan. 14, 2005

(65) Prior Publication Data
US 2005/0157776 A1 Jul. 21, 2005

(30) Foreign Application Priority Data
Jan. 15, 2004 (KR) ...................... 10-2004-0002933

(51) Int. Cl.
*H04B 1/707* (2006.01)
(52) U.S. Cl. .................. 375/148; 375/147; 375/152; 375/150; 375/316; 375/267; 375/346; 375/347; 375/349
(58) Field of Classification Search ................ 375/130, 375/131, 147, 148, 259, 260, 267, 316, 346, 375/347, 349, 152, 150; 455/3.01, 39, 63.1, 455/88, 561, 562.1
See application file for complete search history.

(56) References Cited

U.S. PATENT DOCUMENTS

| | | | | |
|---|---|---|---|---|
| 5,982,327 | A | | 11/1999 | Vook et al. |
| 6,141,393 | A | * | 10/2000 | Thomas et al. ............... 375/347 |
| 6,314,131 | B1 | * | 11/2001 | Roe et al. .................... 375/227 |
| 6,441,786 | B1 | * | 8/2002 | Jasper et al. ................. 342/383 |
| 6,718,184 | B1 | * | 4/2004 | Aiken et al. ............... 455/562.1 |
| 6,865,377 | B1 | * | 3/2005 | Lindskog et al. ............. 455/101 |
| 7,161,974 | B2 | * | 1/2007 | Mehrabani et al. ........... 375/148 |
| 2003/0053525 | A1 | | 3/2003 | Mehrabani et al. |
| 2003/0125091 | A1 | * | 7/2003 | Choi et al. ................... 455/562 |
| 2003/0153360 | A1 | * | 8/2003 | Burke et al. ................. 455/562 |
| 2003/0216156 | A1 | * | 11/2003 | Chun ....................... 455/562.1 |
| 2006/0023653 | A1 | * | 2/2006 | Montalbano ................. 370/315 |

FOREIGN PATENT DOCUMENTS

| KR | 20010113976 A | 12/2001 |
|---|---|---|
| KR | 1020020074771 A | 10/2002 |
| KR | 1020030019838 | 3/2003 |

OTHER PUBLICATIONS

Jinho Choi, Pilot Channel-Aided techniques to compute the beam-forming vector for CDMA systems with antenna array, Sep. 2000, IEEE transaction on vehicular technology, vol. 49, No. 5.*

* cited by examiner

*Primary Examiner*—Chieh M Fan
*Assistant Examiner*—Siu M Lee
(74) *Attorney, Agent, or Firm*—Volentine & Whitt, PLLC

(57) ABSTRACT

In a method of forming a beam, data signals and pilot signals are generated by despreading signals that are received by a plurality of antennas, the received signals including a modulated data signal and a modulated pilot signal, respectively. A first covariance matrix is calculated for the pilot signals. A second covariance matrix is calculated for averages of the pilot signals. A weight vector is calculated based on the first and second covariance matrices. A beam forming output signal for forming a beam is generated based on the data signals and the weight vectors. Therefore, an optimal beam may be accurately formed.

10 Claims, 9 Drawing Sheets

METHOD AND APPARATUS FOR FORMING A BEAM

CROSS REFERENCES TO RELATED APPLICATIONS

This application claims priority under 35 U.S.C. § 119 from Korean Patent Application No. 2004-2933, filed on Jan. 15, 2004, the contents of which are hereby incorporated by reference in its entirety for all purposes as if fully set forth herein.

BACKGROUND AND SUMMARY

1. Technical Field

The present invention relates to a method and an apparatus for forming a beam. More particularly, the present invention relates to a method and an apparatus for forming an optimal beam with high accuracy.

2. Description of the Related Art

In a mobile communication system, the user capacity of the system is inversely proportional to the amount of interference caused by undesired users. Therefore, the undesired users must be excluded from the mobile communication system. To this end, an apparatus may be introduced to form an optimal beam directed toward a desired user or terminal. A beam forming apparatus, for example, equipped in a base station, receives multiple signals that are transmitted from many terminals and/or other base stations. Therefore, the beam forming apparatus needs to select a signal that is transmitted from a terminal of the desired user among the received multiple signals.

One beam forming apparatus calculates weight vectors for forming the optimal beam using data included in the received signals. However, in general the base station cannot obtain correct information concerning data streams included in the data signals. Therefore, the calculated weight vectors cannot achieve a high accuracy. Thus, a need exists for a beam forming apparatus capable of forming the optimal beam with accuracy.

Accordingly, it would be desirable to provide a method and an apparatus for forming an optimal beam with high accuracy.

In accordance with one aspect of the present invention, there is provided a method of forming a beam. In the method, data signals and pilot signals are generated by despreading received signals at a plurality of antennas. Each of the received signals includes a modulated data signal and a modulated pilot signal. A first covariance matrix for the pilot signals is calculated. A second covariance matrix is calculated for averages of the pilot signals. A weight vector is calculated based on the first and second covariance matrices. A beam forming output signal for forming a beam is generated based on the data signals and the weight vector.

In accordance with another aspect of the present invention, there is provided an apparatus for forming a beam. The apparatus comprises a despreading unit configured to generate a plurality of data signals and a plurality of pilot signals by despreading a plurality of received signals, wherein each of the received signals includes a modulated data signal and a modulated pilot signal; a weight calculator configured to calculate a first covariance matrix for the pilot signals, to calculate a second covariance matrix for averages of the pilot signals, and to calculate a weight vector based on the first and second covariance matrices; and a beam forming unit configured to generate a beam forming output signal based on the data signals and the weight vector.

In accordance with still another aspect of the present invention, there is provided an apparatus for forming a beam. The apparatus comprises a despreading unit configured to generate a plurality of data signals and a plurality of pilot signals by despreading a plurality of received signals, each of the received signals including a modulated data signal and a modulated pilot signal; a weight calculator configured to calculate a first covariance matrix for the demodulated pilot signals, to calculate a second covariance matrix for averages of the respective pilot signals, and to calculate a weight vector using the first and second covariance matrices; and a beam forming unit configured to generate a beam forming output signal using the data signals and the weight vector.

In accordance with still another aspect of the present invention, there is provided a communication system including an apparatus for forming a beam. The system comprises a plurality of terminals configured to modulate data signals and pilot signals to generate transmitted signals including a modulated data signal and a modulated pilot signal; and a base station configured to generate a beam forming output signal. Beneficially, the base station comprises a plurality of antennas for receiving the transmitted signals; a despreading unit configured to generate a plurality of despread data signals and a plurality of despread pilot signals by despreading the received signals; a weight calculator configured to calculate a first covariance matrix for the despread pilot signals, to calculate a second covariance matrix for averages of the despread pilot signals, and to calculate a weight vector using the first and second covariance matrices; and a beam forming unit configured to generate the beam forming output signal for forming the beam using the despread data signals and the despread weight vector.

In accordance with still another aspect of the present invention, there is provided a communication system including an apparatus for forming a beam. The system comprises a plurality of base stations configured to modulate data signals and pilot signals to generate signals including a modulated data signal and a modulated pilot signal; and a terminal configured to generate a beam forming output signal. The terminal may comprise an antenna for receiving the received signals; a despreading unit configured to generate a plurality of despread data signals and a plurality of despread pilot signals by despreading the received signals; a weight calculator configured to calculate a first covariance matrix for the modulated pilot signals, to calculate a second covariance matrix for averages of the despread pilot signals, and to calculate a weight vector using the first and second covariance matrices; and a beam forming unit configured to generate the beam forming output signal for forming the beam using the despread data signals and the despread weight vector.

BRIEF DESCRIPTION OF THE DRAWINGS

The present invention will become more apparent to those of ordinary skill in the art by describing, in detail, exemplary embodiments thereof with reference to the attached drawings, wherein like elements are represented by like reference numerals, which are given by way of illustration only and thus do not limit the exemplary embodiments of the present invention.

DESCRIPTION OF THE EMBODIMENTS

The present invention will become more apparent to those of ordinary skill in the art by describing, in detail, exemplary embodiments thereof with reference to the attached drawings, wherein like elements are represented by like reference numerals, which are given by way of illustration only and thus do not limit the exemplary embodiments of the present invention.

In the description to follow, it is assumed that the method of forming a beam is used in a Code Division Multiple Access (CDMA) system.

Figure 1:
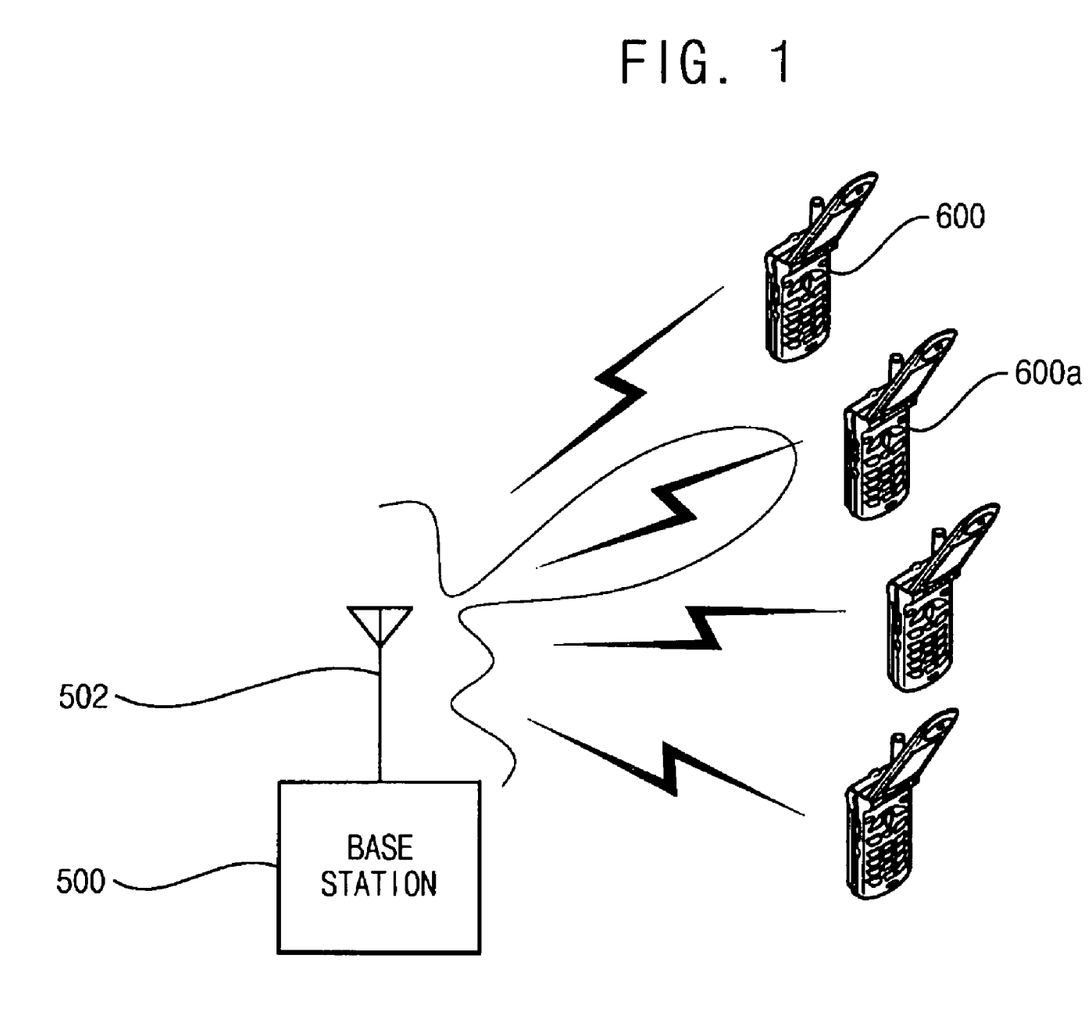
FIG. 1 is a schematic view illustrating a general method of forming a beam.

FIG. 1 is a schematic view of a communication system for illustrating the formation of a beam.

Referring to FIG. 1, an antenna 502 in a base station 500 receives signals from a plurality of terminals 600. Each received signal includes a modulated data signal and a modulated pilot signal. Then, the base station 500 selects a terminal 600a that the base station 500 should access among the plurality of terminals 600. Advantageously, the terminal 600a is selected by forming a beam. In particular, in one method an optimal beam is formed in a direction toward the desired terminal 600a and nulls are formed in directions toward the undesired terminals 600. As a result, the base terminal 500 can access the desired terminal 600a. The above-mentioned method is designated as an optimal beam forming method.

Meanwhile, in another method of forming a beam, only an optimal beam is formed in a direction toward the desired terminal 600a regardless of other terminals 600. This method is designated as a sub-optimal beam forming method. Beneficially, the optimal beam forming method is employed.

Typically, the terminals 600 are mobile and so their positional relationships (i.e., distance and direction) with respect to the base station 500 will vary with time and, in that case, would not be known a priori by the base station 500. Accordingly, an apparatus and method are needed to form the beam in the direction of the desired terminal 600a.

Figure 2:
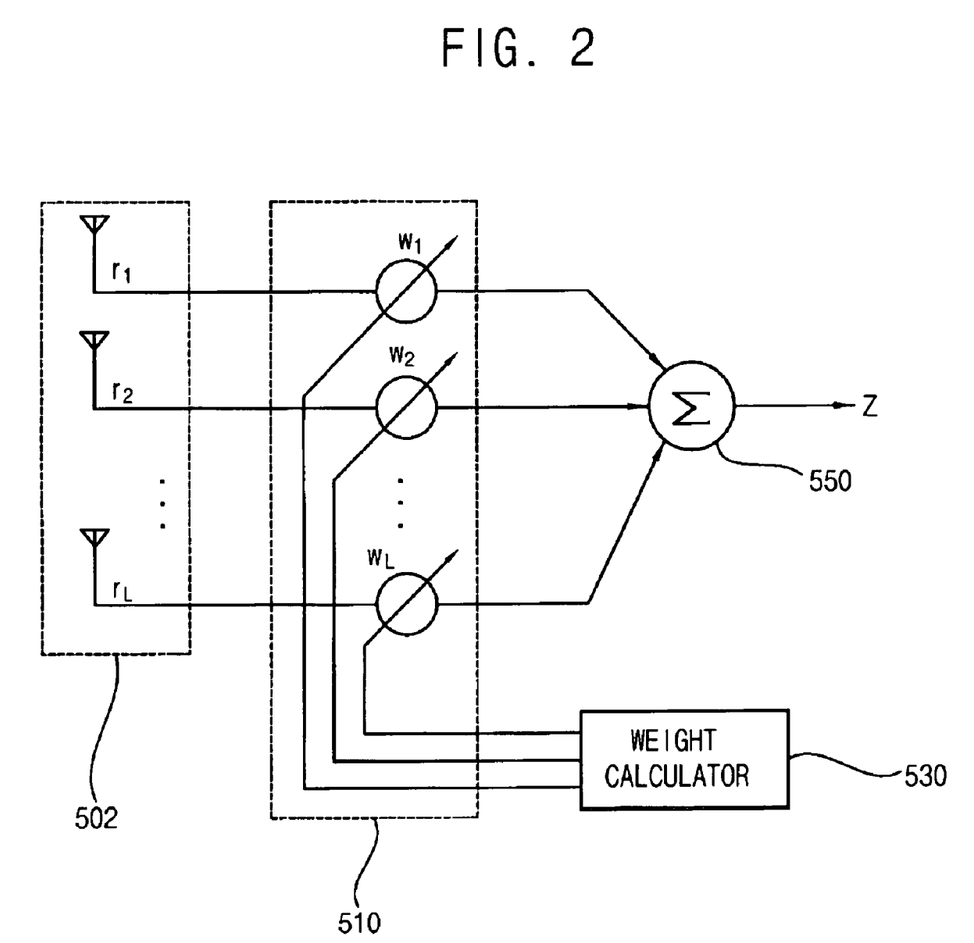
FIG. 2 is a schematic view illustrating a beam forming apparatus.

FIG. 2 is a schematic view illustrating a beam forming apparatus.

Referring to FIG. 2, the base station 500 receives signals from the terminals 600 through multiple antennas 502.

The base station 500 may form a beam using a directional antenna or an omni-directional antenna. Particularly, the base station 500 may use the directional antenna to increase the signal gain in a direction toward a desired terminal while decreasing the signal gain in a direction toward the undesired terminals. Alternatively, the base station 500 may instead use the omni-directional antenna to select the desired terminal using phase differences between the received signals or respective weights of the received signals. Since the terminals in the CDMA system generally operate in a high-mobility channel, it is generally desirable that a beam forming apparatus uses an omni-directional antenna. Therefore, in the discussion to follow it is assumed that the antennas 502 described below are omni-directional antennas.

The beam forming apparatus of FIG. 2 includes a weight calculator 530, a multiplier 510 and a summer 550 to form a beam. The weight calculator 530 calculates a weight vector corresponding to the received signals and the multiplier 510 multiplies data signals of the received signals by corresponding complex weights in the weight vector. The summer 550 sums outputs of the multiplier 510, comprising weighted data signals, to generate a beam forming output signal, Z.

A method of forming a beam will be described below in detail.

A delay $\tau_L$ of a signal received in an L-th antenna from a K-th user's terminal is expressed as the following equation 1:

$$\tau_L(\theta_K) = \frac{d}{c} * (L-1) * \sin\theta_K \quad \text{[Equation 1]}$$

where d denotes a distance between adjacent antennas, c denotes the velocity of light and $\theta_K$ denotes an angle of arrival of the received signal from the K-th user's terminal.

Since the delay of the received signal in the L-th antenna is expressed as the above equation 1, a phase difference $\phi_L(\theta_K)$ of the received signal in the L-th antenna from the K-th user's terminal is expressed by the following equation 2:

$$\varphi_L(\theta_K) = 2\pi f_0 \times \tau_L(\theta_K) = 2\pi \times \frac{d}{\lambda} \times (L-1) \times \sin\theta_K \quad \text{[Equation 2]}$$

wherein $f_0$ denotes a carrier frequency of the received signal, and $\lambda$ denotes a wavelength thereof. To form an appropriate beam, d is limited to be less than $\lambda/2$.

Based on the above equations 1 and 2, the received signal $r_L$ at the L-th antenna from the K-th user's terminal is expressed as the following equation 3:

$$r_L = \sum_{p=1}^{p=K} x_p e^{j\varphi L(\theta_p)} + n \quad \text{[Equation 3]}$$

wherein $X_K$ represents a complex modulation signal that is transmitted from the K-th user's terminal, and n represents Additive White Gaussian Noise (AWGN) in the respective antennas.

A beam forming output signal z is generated based on the received signal and weights corresponding to the received signal. The beam forming output signal z is expressed as the following equation 4:

$$z = \sum_{q=1}^{q=L} \omega_q^* \times r_q = \vec{\omega}^H \cdot \vec{r} \quad \text{[Equation 4]}$$

where $\vec{w} = [w1, w2, \ldots, wL]^T$ and $\vec{r} = [r1, r2, \ldots, rL]^T$; is a transpose of a matrix or vector; $\omega_L$ denotes a complex weight at the user's terminal; the superscript * denotes complex conjugate; and H denotes the Hermitian transpose. Therefore, the beam forming output signal z corresponds to the vector inner product between the weight vector and a signal vector.

In the apparatus for forming the beam that produces the above beam forming output signal z, a weight vector $\vec{\omega}_{OPT}$ for an optimal beam may be expressed as the following equation 5:

$$\vec{\omega}_{OPT} = \mu_0 \times R_N^{-1} \times \vec{S}_K \quad \text{[Equation 5]}$$

wherein $R_N$ denotes a covariance matrix for noise and $\vec{S}_K$ denotes a steering vector. $\mu_0$ is a constant. The covariance matrix for noise $R_N$ is given by $R_N = R_r - R_u$, wherein $R_r$ is a covariance matrix for the received signal and $R_u$ is a covariance matrix for a despread received signal. The steering vector $\vec{S}_K$ is given by:

$$\vec{S}_K = [e^{j\phi_1(\theta_K)}, e^{j\phi_2(\theta_K)}, \ldots, e^{j\phi_l(\theta_K)}]^T$$

When the steering vector is precisely computed, the weight vector for an optimal beam only depends on the covariance matrix for noise. However, it may be difficult to precisely compute the weight vector when a signal component is not completely removed from the covariance matrix for the received signal $R_r$. Therefore, the beam forming apparatus of FIG. 2 uses well-known pilot signals to accurately compute the weight vectors.

Figure 3:
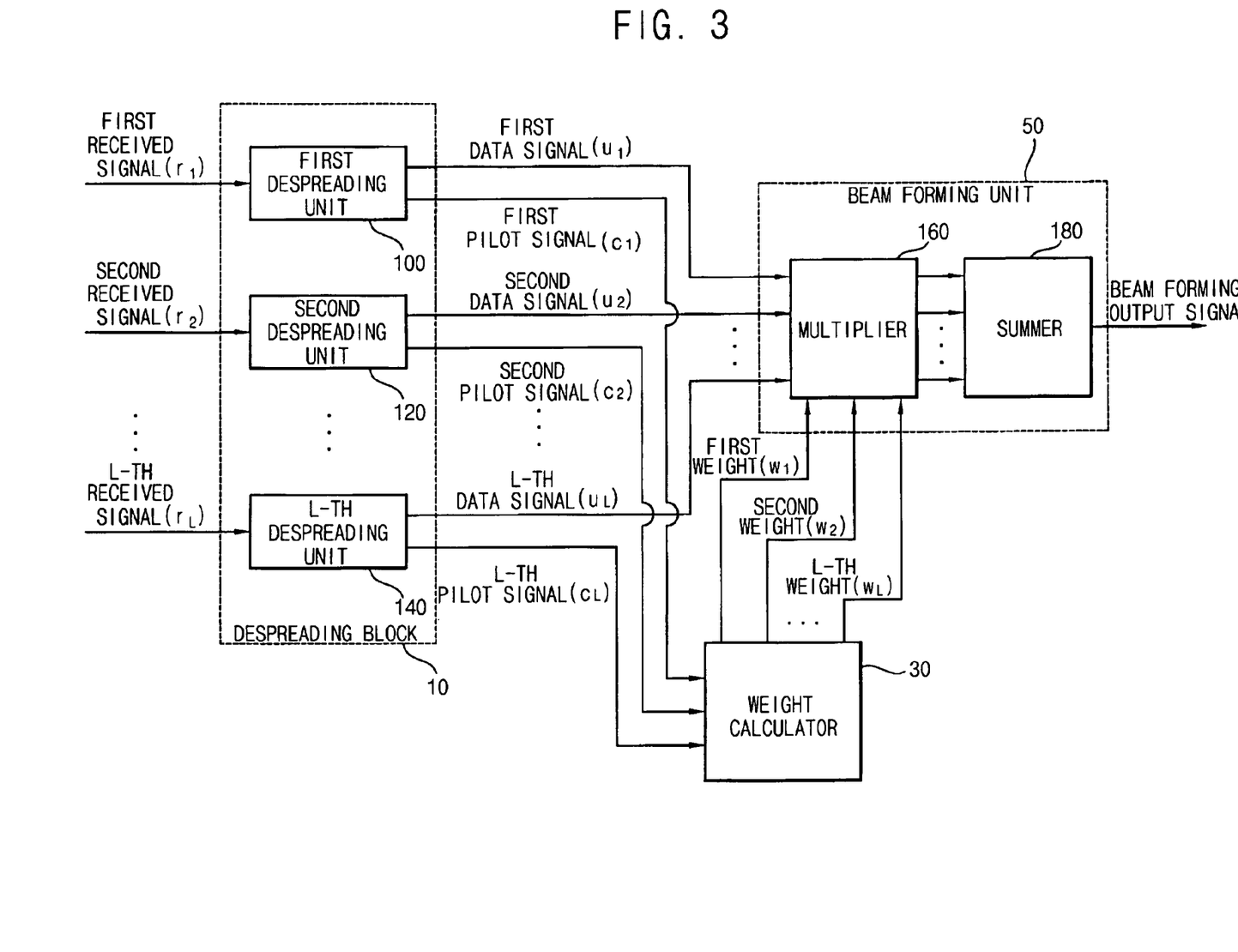
FIG. 3 is a block diagram illustrating an exemplary embodiment of a beam forming apparatus.

FIG. 3 is a block diagram illustrating an exemplary embodiment of a beam forming apparatus.

Referring to FIG. 3, the beam forming apparatus includes a despreading block 10, a weight calculator 30 and a beam forming unit 50.

The despreading block 10 includes a first despreading unit 100, and second through L-th despreading units 120 and 140. The despreading units 100, 120 and 140 despread the signals that are received in respective antennas. Particularly, the despreading units 100, 120 and 140 despread the modulated data signals in the received signals, thereby generating data signals. In addition, the despreading units 100, 120 and 140 despread the modulated pilot signals in the received signals, thereby generating pilot signals.

The weight calculator 30 calculates the weight vectors that correspond to the received signals based on the pilot signals. The terminal and the base station have information concerning the pilot signal. In addition, the pilot signal has simplified data streams such as "000000 . . . ", "111111 . . . " or "01010101 . . .", etc. Therefore, the apparatus for forming the beam may accurately compute the weight vectors using the pilot signals.

The beam forming unit 50 includes a multiplier 160 and a summer 180.

The multiplier 160 multiplies the data signals by corresponding complex weights in the weight vector.

The summer 180 sums outputs of the multiplier 160 to generate the beam forming output signal for forming an optimal beam.

The beam forming apparatus of FIG. 3 calculates the weight vectors using the pilot signals so that the weight vectors may be accurately computed to form the optimal beam.

In the CDMA system, an uplink channel or a downlink channel is available for transmission of data. First data is transmitted from the terminal to the base station on the uplink channel, and second data is transmitted from the base station to the terminal on the downlink channel.

The beam forming apparatus of FIG. 3 may be provided in the terminal, or in the base station. That is, beneficially, a terminal equipped with the beam forming apparatus may receive signals from a plurality of base stations, and may form the beam in the direction of the base station with which communication is desired to take place. Particularly, the beam forming apparatus may be provided in the base station for the uplink, whereas the beam forming apparatus may be equipped in the terminal for the downlink. In the uplink channel, the pilot signal can be more accurately computed, so that the weight vector also can be accurately computed. In the downlink channel, the base station transmits signals whose power levels are greater than those of signals that are transmitted in the uplink channel, so that the weight vector can be more accurately computed than in the uplink channel. Therefore, the beam forming apparatus may form the optimal beam with accuracy.

Figure 4:
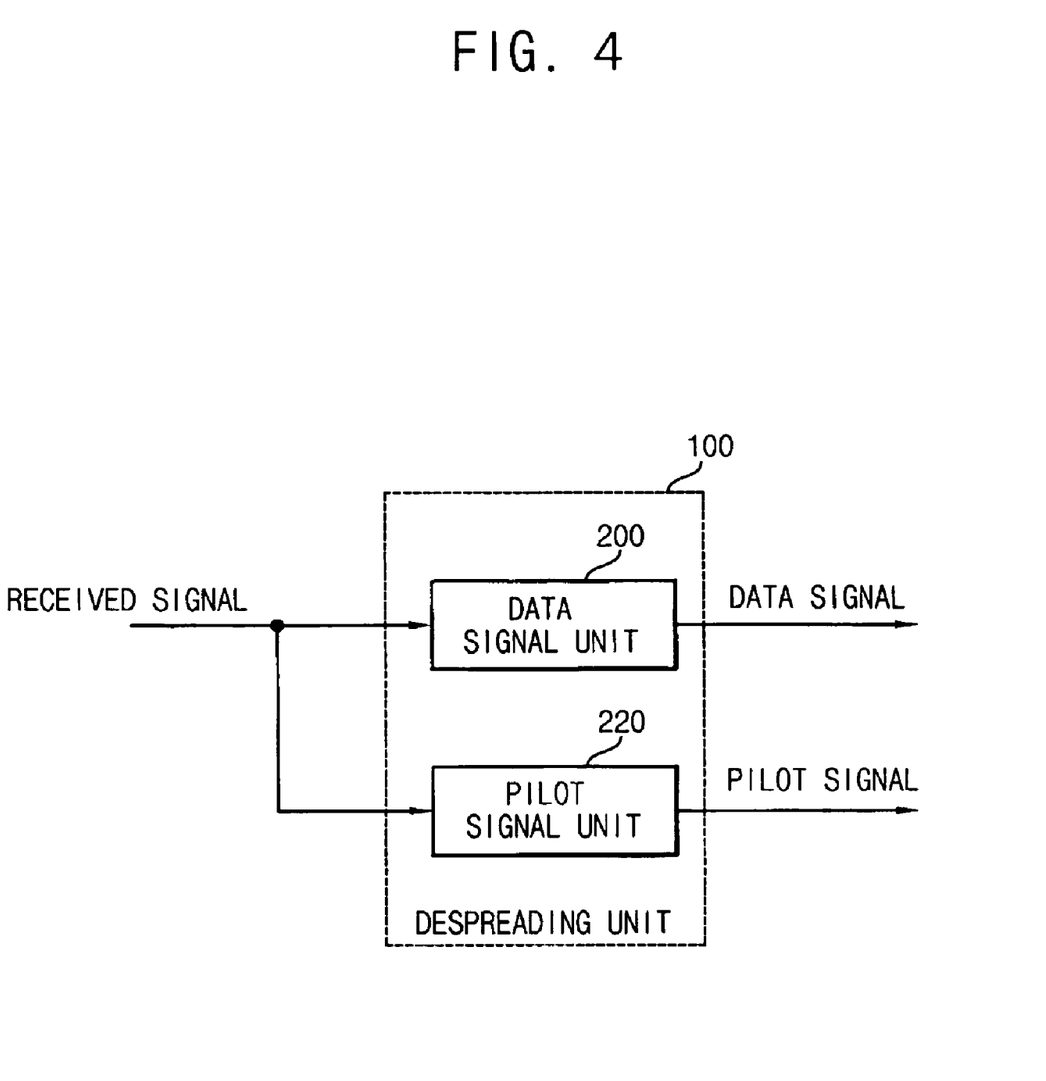
FIG. 4 is a block diagram illustrating an exemplary embodiment of the despreading unit of FIG. 3.

FIG. 4 is a block diagram illustrating an exemplary embodiment of the despreading unit of FIG. 3.

Referring to FIG. 4, the first through L-th despreading units 100, 120 and 140 in the dispreading block 10 include a data signal unit 200 and a pilot signal unit 220, respectively.

Each of the received signals includes a third data stream that is obtained by multiplying a first data stream in the modulated data signal by a second data stream in a corresponding data PN (Pseudo Noise) code.

In addition, each received signal includes a sixth data stream that is obtained by multiplying a fourth data stream in the modulated pilot signal by a fifth data stream in the corresponding pilot PN code.

The data signal unit 200 demodulates the third data stream into the first data stream by multiplying the third data stream in the received signals by the second data stream in the data PN code. That is, the data signal unit 200 correlates the third data stream with the second data stream. Next, the data signal unit 200 integrates the first data stream to generate a data signal having a first integrated correlation value.

The pilot signal unit 220 demodulates the sixth data stream into the fourth data stream by multiplying the sixth data stream in the received signals by the fifth data stream in the pilot PN code. That is, the pilot signal unit 220 correlates the sixth data stream with the fifth data stream. Next, the pilot signal unit 220 integrates the fourth data stream to generate a pilot signal having a second integrated correlation value.

In short, despreading the received signals corresponds to demodulating the received signals.

Figure 5:
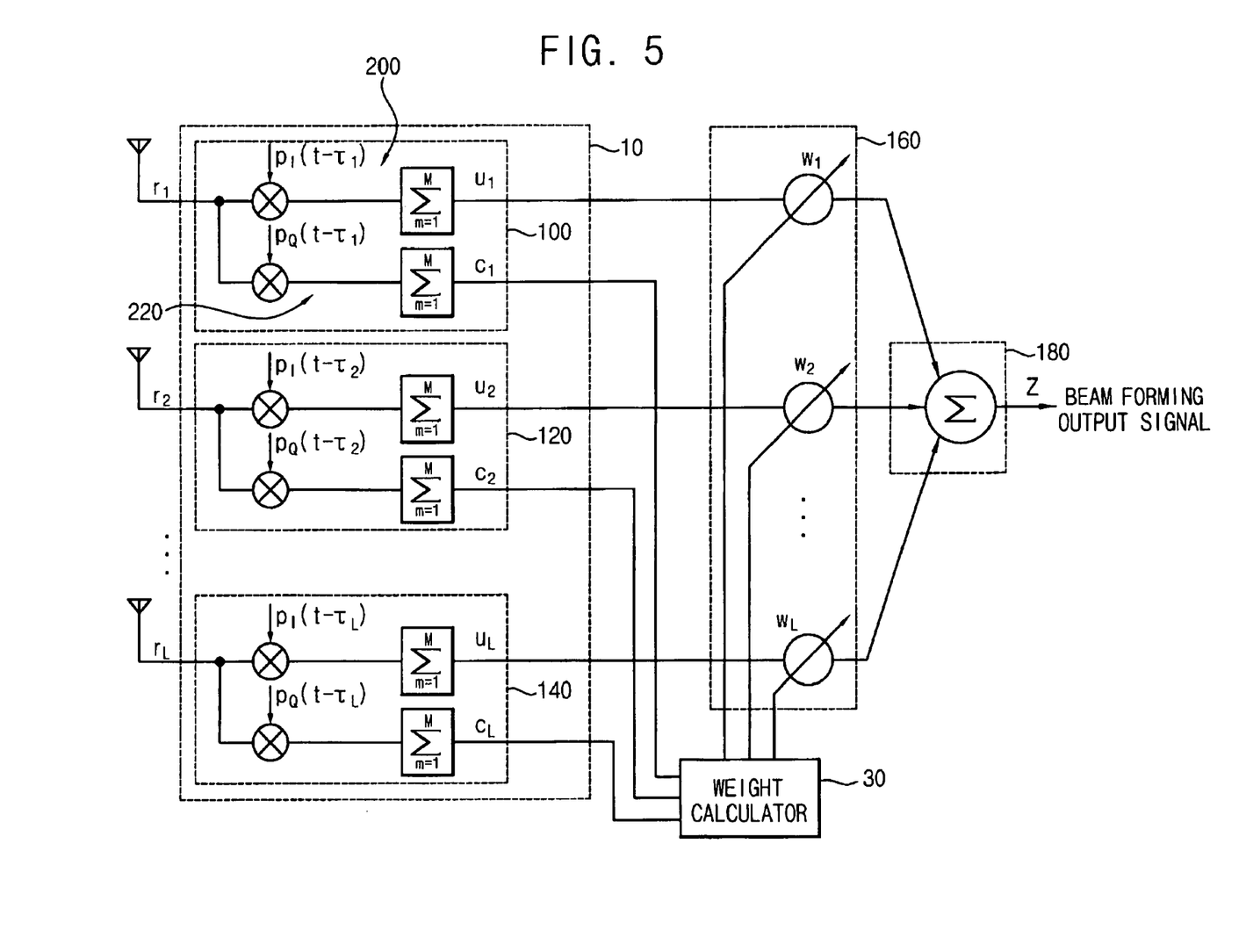
FIG. 5 is a circuit diagram illustrating an exemplary embodiment of the beam forming apparatus of FIG. 3.

FIG. 5 is a circuit diagram illustrating an exemplary embodiment of the beam forming apparatus of FIG. 3.

Referring to FIG. 5, the data signal unit 200 demodulates the third data stream into the first data stream by multiplying the third data stream in the received signals by the second data stream in the data PN code. When demodulated, the third data stream is multiplied by delayed data PN code. Because the received signal is delayed with respect to when it was transmitted, the time period corresponding to the delay needs to be taken into account.

As a result, the received signals are synchronized. The data signal unit 200 integrates the first data stream to generate the data signal having the first integrated correlation value. That is, the data signal unit 200 integrates the correlated third data stream with the second data stream. The correlated third data stream is integrated with the second data stream by multiplying the third data stream by the second data stream in sequence, and then adding the resulting products. For example, when the third data stream is equal to "0, 1, 1, 0 . . . ", and the second data stream is equal to "1, 0, 1, 1 . . . ", the resulting integrated correlation value is "0x1+ 1x0+1x1+0x1+ . . . ".

The pilot signal unit 220 demodulates the sixth data stream into the fourth data stream by multiplying the sixth data stream in the received signals by the fifth data stream in the pilot PN code. When demodulated, the sixth data stream is multiplied by a delayed pilot PN code. As a result, the received signals are synchronized. Next, the pilot signal unit 220 integrates the fourth data stream to generate the pilot signal having the second integrated correlation value. That is, the pilot signal unit 220 integrates the correlated sixth data stream with the fifth data stream to generate the pilot signal. A demodulated pilot signal $\hat{C}_L$ in the L-th antenna is expressed as the following equation 6:

$$\hat{C}_L = x \cdot e^{j\phi L(\theta)} + I_L + n = C_L + I_L + n \qquad \text{[Equation 6]}$$

where $I_L$ denotes an interference signal generated when despread by other simultaneous users, $C_L$ denotes a pilot signal from a terminal of the user and n denotes Additive White Gaussian Noise components. For purpose of brevity, the symbol k that represents a user is omitted.

The weight calculator 30 calculates the weight vectors. From the above equation 5, the weight vector $\vec{\omega}_{OPT}$ is given by $\vec{\omega}_{OPT} = \mu_0 \times R_N^{-1} \times \vec{S}$. In addition, the covariance matrix for noise $R_N$ according to an exemplary embodiment is expressed as the following equation 7:

$$R_N = \hat{R}_c - \overline{R}_c, \ \overline{R}_c = E[c \ c^H], \ c = [c_1, c_2, \ldots, c_L]^T \qquad \text{[Equation 7]}$$

where $\hat{R}_c$ represents a covariance matrix for an approximate value of the pilot signal, and $\overline{R}_c$ represents a covariance matrix for an average of the pilot signal. It can be noted from the above equation 7 that the covariance matrix for the noise is obtained by subtracting the covariance matrix for the average of the pilot signal from the covariance matrix for the approximate value of the pilot signal. Thus, the beam forming apparatus calculates the weight using only the pilot signals. In addition, since the pilot signal is well known to both the base station and the terminal, the pilot signal can be accurately computed and accordingly, the covariance matrix for an average of the pilot signal $\overline{R}_c$ also can be accurately calculated. As a result, the covariance matrix for the noise $R_N$ is more accurately calculated. Further, since the pilot signal is well known, the average of the pilot signal may be calculated within a longer time range compared with the data signal. Therefore, the covariance matrix for the noise calculated by using the pilot signal is more accurate than the covariance matrix for the noise calculated by using the data signal. Noise is removed from the average of the pilot signal. Therefore, when the covariance matrix for the average of the pilot signal is subtracted from the covariance matrix for the approximate value of the pilot signal, the covariance matrix for the noise remains.

The multiplier 160 multiplies data signals by the corresponding complex weights in the weight vector, respectively.

The summer 180 sums outputs of the multiplier 160 to generate the beam forming output signal.

Figure 6:
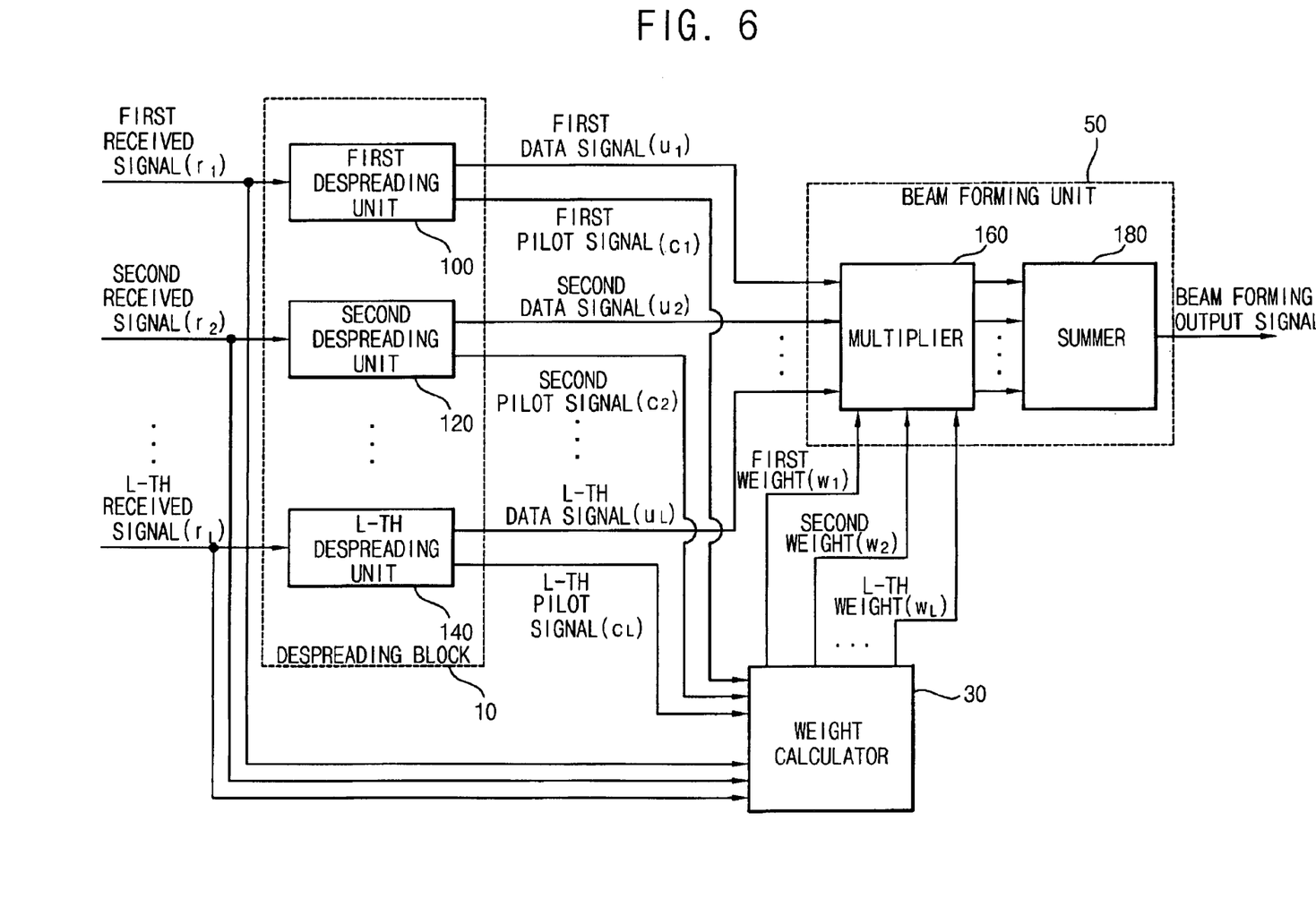
FIG. 6 is a block diagram illustrating another exemplary embodiment of a beam forming apparatus.

FIG. 6 is a block diagram illustrating another embodiment of a beam forming apparatus.

Referring to FIG. 6, the beam forming apparatus includes a despreading unit 10, a weight calculator 30 and a beam forming unit 50. Components in FIG. 6 have structure and/or function substantially similar to the components in FIG. 3 except the weight calculator 30. Therefore, the same reference numerals identify similar or same elements in both FIG. 3 and FIG. 6, and thus the detailed descriptions of the similar or same elements will be omitted.

The weight calculator 30 calculates the weight vectors using the pilot signals and the received signals. From the above equation 5, the weight vector is given by $\vec{\omega}_{OPT} = \mu_0 \times R_N^{-1} \times \vec{S}$, and the covariance matrix for noise $R_N$ is expressed as the following equation 8:

$$R_N = R_r - \overline{R}_c \qquad \text{[Equation 8]}$$

As shown in the above equation. 8, since the covariance matrix for noise $R_N$ is obtained using the covariance matrix for the pilot signal $\overline{R}_c$, it can be noted that the weight vector uses the pilot signal instead of the data signal. Therefore, the weight calculator 30 may calculate the weight vector more accurately compared to the conventional beam forming apparatus.

Figure 7:
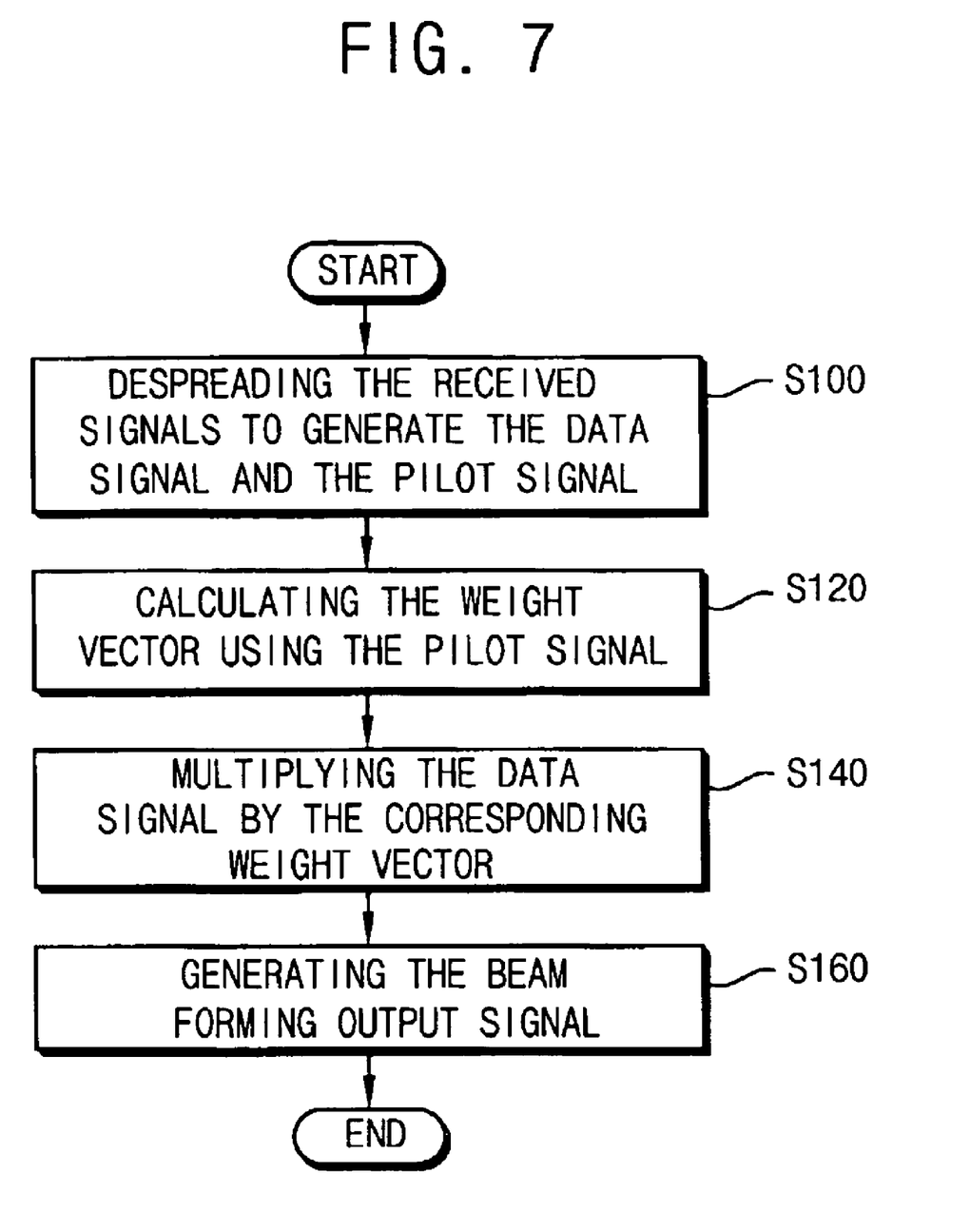
FIG. 7 is a flowchart illustrating a method of forming a beam according to an exemplary embodiment.

FIG. 7 is a flowchart illustrating a method of forming a beam according to an exemplary embodiment.

Referring to FIG. 7, the received signals are despread to generate the data signals and the pilot signals (step S100).

The weight vectors are calculated using the pilot signals (step S120). Alternatively, the weight vectors may be calculated using the pilot signals and the received signals.

The data signals are multiplied by the weight vectors, respectively (step S140), thereby generating the beam forming output signal (step S160).

Figure 8:
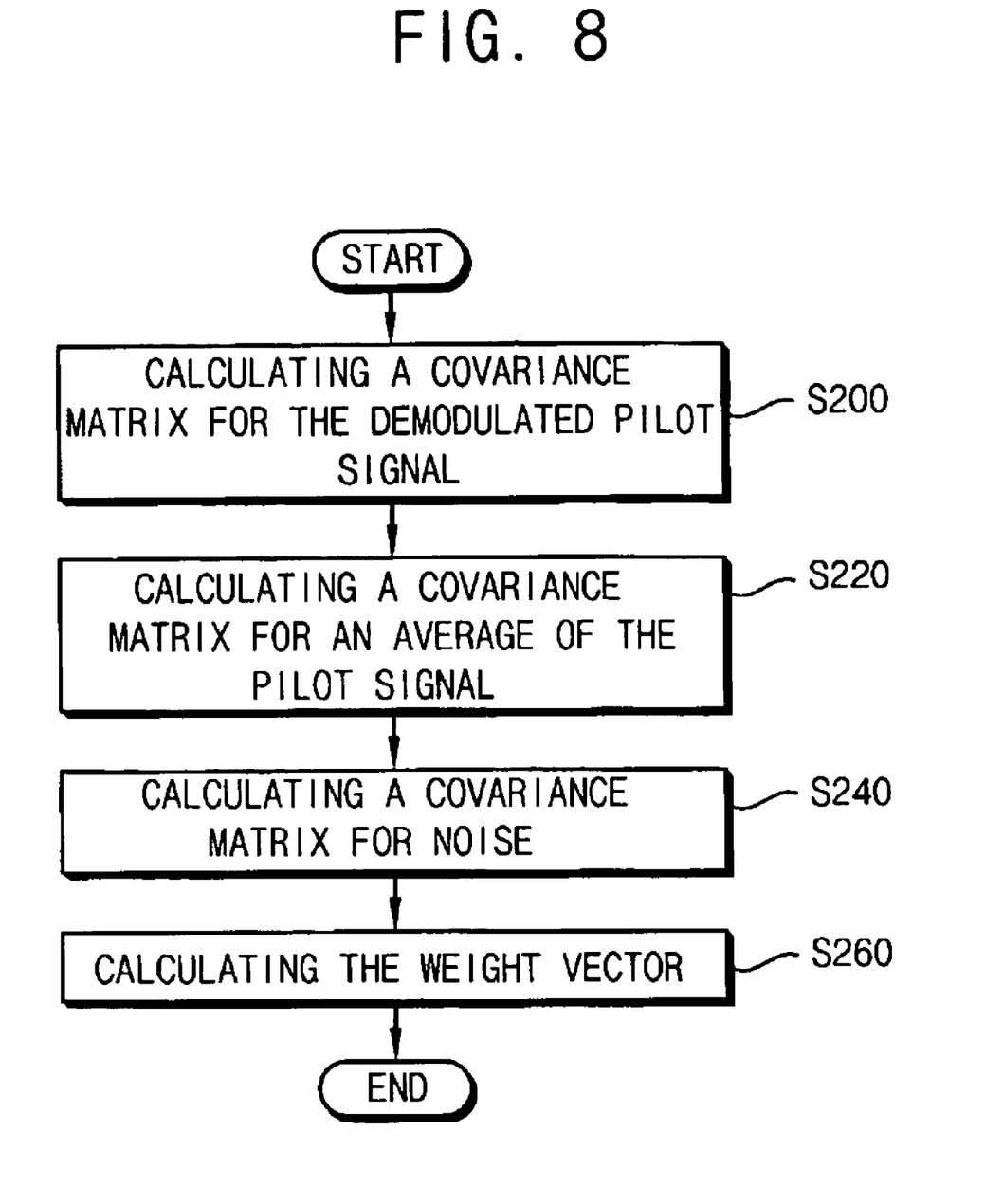
FIG. 8 is a flowchart illustrating a process of calculating a weight vector according to an exemplary embodiment.

FIG. 8 is a flowchart illustrating a process of calculating a weight vector according to an exemplary embodiment.

Referring to FIG. 8, the covariance matrix for the demodulated pilot signal is calculated (step S200).

Subsequently, the covariance matrix for an average of the pilot signal is calculated (step S220).

The covariance matrix for noise is then calculated by subtracting the covariance matrix for the average of the pilot signal from the covariance matrix for the pilot signal (step S240).

The weight vector is calculated using the covariance matrix for noise and the steering vector (step S260).

Figure 9:
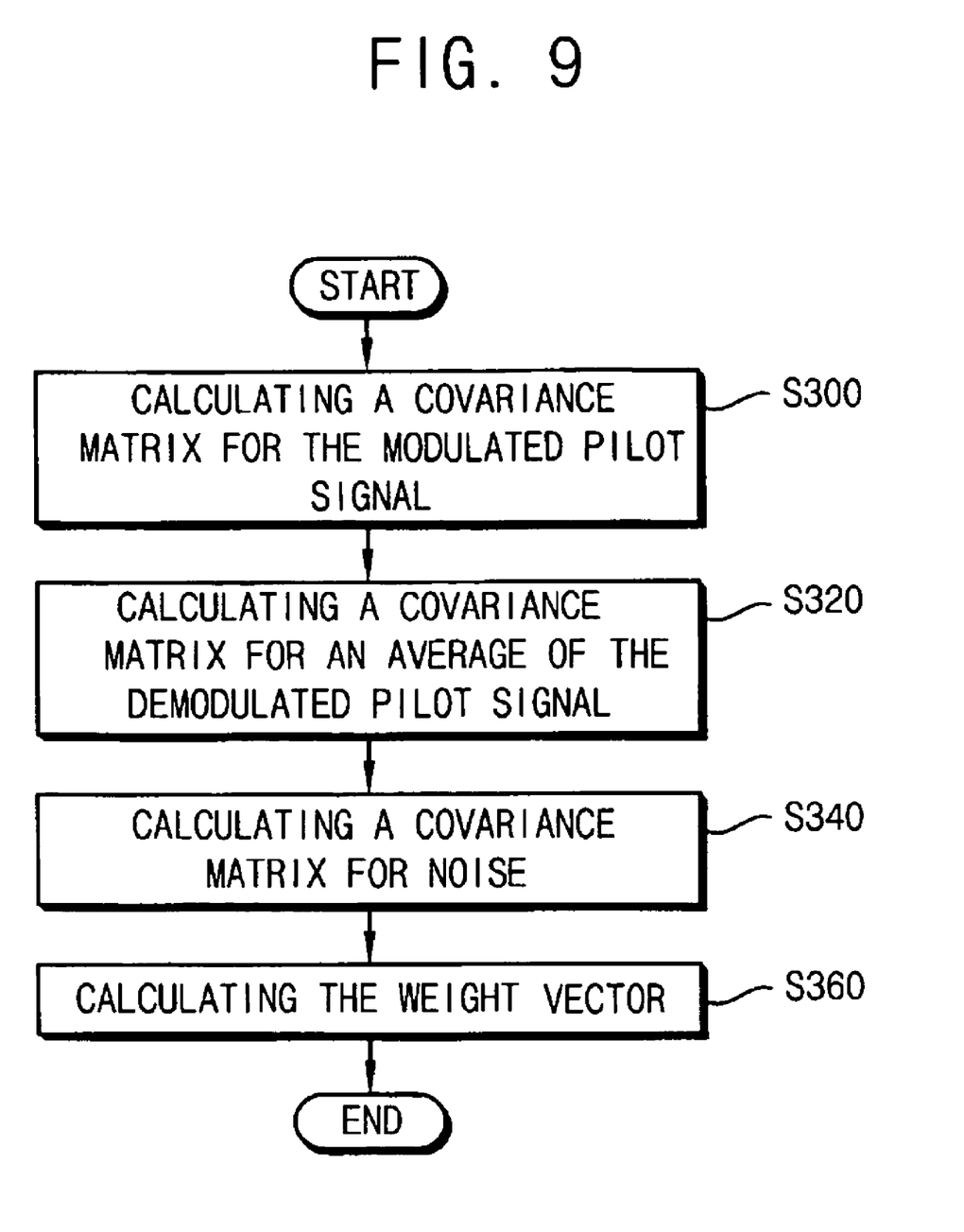
FIG. 9 is a flowchart illustrating a process of calculating a weight vector according to another exemplary embodiment.

FIG. 9 is a flowchart illustrating a process of calculating a weight vector according to another exemplary embodiment.

Referring to FIG. 9, the covariance matrix for the modulated pilot signal is calculated (step S300).

The covariance matrix for an average of the demodulated pilot signal is calculated (step S320).

The covariance matrix for noise is then calculated by subtracting the covariance matrix for the average of the demodulated pilot signal from the covariance matrix for the modulated pilot signal (step S340).

The weight vector is calculated using the covariance matrix for noise and the steering vector (step S360).

Accordingly, in the method and apparatus for forming a beam, pilot signals are used to calculate the weight vector, thereby forming the optimal beam with accuracy.

Having thus described exemplary embodiments of the present invention, it is to be understood that the invention defined by the appended claims is not to be limited by particular details set forth in the above description as many apparent variations thereof are possible without departing from the spirit or scope thereof as hereinafter claimed.

What is claimed is:

1. A method of forming a beam by a beamforming apparatus in a communication system, the method comprising:
   generating demodulated data signals and demodulated pilot signals by despreading received signals received at a plurality of antennas, each of the received signals including a modulated data signal and a modulated pilot signal;
   calculating a first covariance matrix for the demodulated pilot signals generated at a first time;

calculating a second covariance matrix for averages of accumulated demodulated pilot signals generated over a time interval;

calculating a weight vector based on a difference between the first covariance matrix and second covariance matrix; and generating a beam forming output signal for forming a beam based on the demodulated data signals and the weight vector.

2. The method of claim 1, wherein generating the beam forming output signal comprises:

multiplying the demodulated data signals by corresponding complex weights of the weight vector to produce weighted data signals; and generating the beam forming output signal by summing the weighted data signals.

3. The method of claim 1, wherein generating the demodulated data signals and the demodulated pilot signals comprises:

multiplying first data streams in the modulated data signal by second data streams in a first Pseudo Noise (PN) code to generate third data streams;

multiplying fourth data streams in the modulated pilot signal by fifth data streams in a second PN code to generate sixth data streams;

integrating the third data streams to generate the demodulated data signals having first integrated correlation values; and integrating the sixth data streams to generate the demodulated pilot signals having second integrated correlation values.

4. The method of claim 1, wherein the received signals are received from at least two terminals.

5. The method of claim 1, wherein the received signals are received from at least two base stations.

6. An apparatus for forming a beam, comprising:

a despreading unit configured to generate a plurality of demodulated data signals and a plurality of demodulated pilot signals by despreading a plurality of received signals, wherein each of the received signals includes a modulated data signal and a modulated pilot signal;

a weight calculator configured to calculate a first covariance matrix for the demodulated pilot signals generated at a first time, to calculate a second covariance matrix for averages of accumulated demodulated pilot signals generated over a time interval, and to calculate a weight vector based on a difference between the first covariance matrix and the second covariance matrix; and a beam forming unit configured to generate a beam forming output signal based on the demodulated data signals and the weight vector.

7. The apparatus of claim 6, wherein the beam forming unit includes:

a multiplier configured to multiply the demodulated data signals by a corresponding weight vector and produce weighted data signals; and a summer configured to sum the weighted data signals to generate the beam forming output signal.

8. The apparatus of claim 6, wherein the despreading unit includes:

a data signal unit configured to multiply first data streams in the modulated data signal by second data streams in a first PN code to generate third data streams, and to integrate the third data streams to generate the demodulated data signals having first integrated correlation values; and a pilot signal unit configured to multiply fourth data streams in the modulated pilot signal by fifth data streams in a second PN code to generate sixth data streams, and to integrate the sixth data streams to generate the demodulated pilot signals having second integrated correlation values.

9. A communication system including an apparatus for forming a beam, comprising:

a plurality of terminals configured to modulate data signals and pilot signals to generate transmitted signals, each including a modulated data signal and a modulated pilot signal; and a base station configured to generate a beam forming output signal for forming a beam, wherein the base station comprises, a plurality of antennas for receiving the transmitted signals as received signals;

a despreading unit configured to generate a plurality of demodulated data signals and a plurality of demodulated pilot signals by despreading the received signals;

a weight calculator configured to calculate a first covariance matrix for the demodulated pilot signals generated at a first time, to calculate a second covariance matrix for averages of accumulated demodulated pilot signals generated over a time interval, and to calculate a weight vector based on a difference between the first covariance matrix and the second covariance matrix; and a beam forming unit configured to generate the beam forming output signal for forming the beam using the demodulated data signals and the weight vector.

10. The system of claim 9, wherein each of the antennas is an omni-directional antenna.

* * * * *